July 12, 1949.
F. B. BUFFINGTON
2,476,237
AUTOMATIC SELF-CENTERING BRAKE WEAR
ADJUSTMENT MECHANISM
Filed July 30, 1946
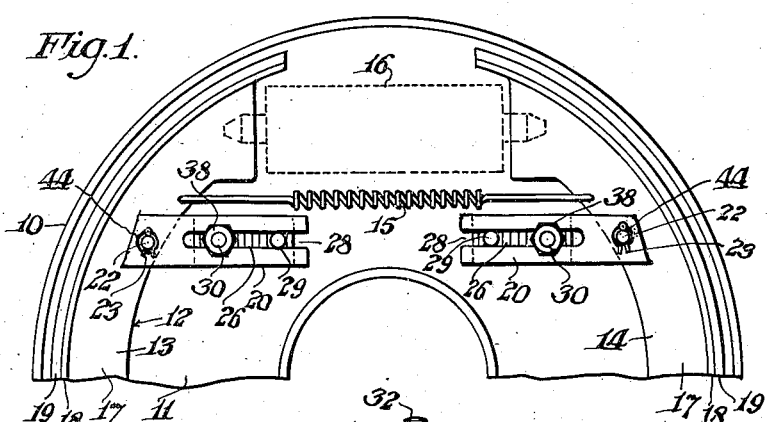
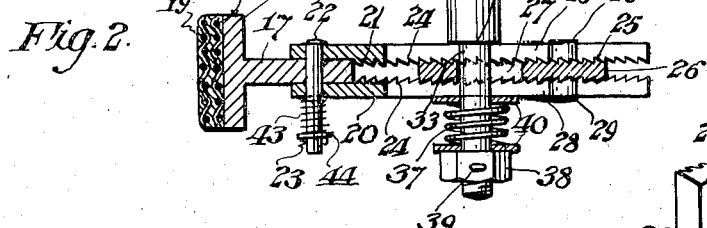
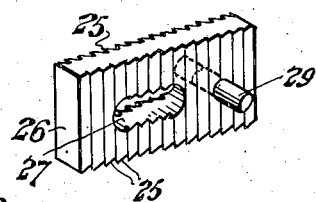
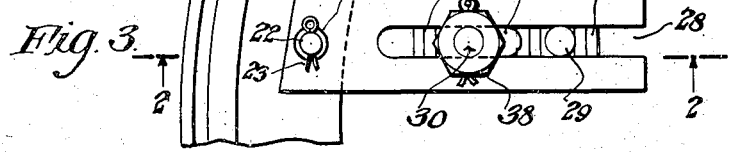
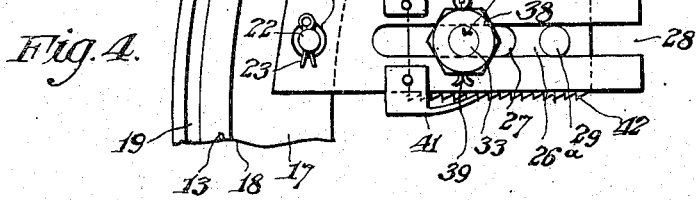
Inventor:
Frank B. Buffington,
By W. W. Williamson
Attorney.

Patented July 12, 1949

2,476,237

UNITED STATES PATENT OFFICE 2,476,237

AUTOMATIC SELF-CENTERING BRAKE WEAR ADJUSTMENT MECHANISM

Frank B. Buffington, Chester, Pa.

Application July 30, 1946, Serial No. 687,133

4 Claims. (Cl. 188—79.5)

My invention relates to automatic self-centering brake wear adjustment mechanisms and has for one of its objects to improve the construction of similar mechanisms disclosed in my Patent No. 2,286,711, dated June 16, 1942.

Another object of the present invention is to construct the units of the apparatus so that each may be installed without the possibility of fouling the brake mechanism thus making the structure practically fool-proof.

Another object of the invention is to provide means for compensating for the wear on brake linings whereby the surface of the brake linings will always be the same distance from the brake drum when the shoes are retracted, regardless of the thickness of said linings.

Another object of the invention is to provide a structure in which all of the shoes of a multiple brake shoe mechanism will be automatically centered upon and after the first operation of the brake system whereby an even pressure will always be applied when using the brake.

A further object of this invention is to provide brake wear adjustment mechanisms comprising a unit for each brake shoe, each unit including a pair of companion jaws attached to a brake shoe and provided with a ratchet element coacting with a ratchet plate between the jaws, which plate cooperates with a supporting trunnion or post fixed to a portion of the brake drum structure.

A still further object of the invention is to provide the jaws with open ended slots in which slide the ends of a pin, lugs or the like, carried by the ratchet plate. The open ended slots prevent fouling of the brake mechanism even should a workingman wrongly install the apparatus.

With the above and other objects in view this invention consists of the details of construction and combination of elements hereinafter set forth and then designated by the claims.

In order that those skilled in the art to which this invention appertains may understand how to make and use the same I will describe its construction in detail referring by the numerals to the accompanying drawing forming a part hereof, in which:

Fig. 1 is an elevation of the inside of a portion of an automobile brake structure illustrating the automatic self-centering brake wear adjustment mechanisms applied thereto.

Fig. 2 is an enlarged sectional elevation of one of the units and a portion of the brake drum structure, taken on the line 2—2 of Fig. 3.

Fig. 3 is a side or face view of one of the units and a portion of a brake shoe.

Fig. 4 is a similar view of a modification.

Fig. 5 is a perspective view of the ratchet plate having teeth arranged for use in connection with that form of unit illustrated in Figs. 1, 2 and 3.

In carrying out my invention as herein embodied 10 represents the usual brake drum carried by a vehicle wheel or other revolving apparatus with which drum is associated a relatively stationary supporting element or wall 11, such as a dust pan or apron used to exclude foreign matter, such as dust, dirt, mud, rain, snow and the like.

Cooperating with the brake drum is a brake block 12 of any suitable construction and, for purposes of illustration only, such block is shown as including two brake shoes 13 and 14, one end of each being pivoted, as usual, and free end urged in one direction, away from the drum, by a spring 15 and actuated in the opposite direction by any suitable brake operating means generally, but not necessarily, controlled by the pedal. For purposes of illustration only, there is shown in dotted lines a cylinder 16 carrying the pistons which are connected with the brake shoes 13, 14. These brake shoes each include a web 17 and a head 18 on which the brake lining 19 is mounted.

To each brake shoe 13, 14 is attached a pair of companion jaws 20 and 21, of a wear adjusting unit, by any suitable fastening means, for example, a headed pin 22 projected through the outer ends of the jaws and the web 17 of a brake shoe. The pin 22 may be held against accidental displacement by a cotter key 23 passing through the pin end opposite the head.

A spring 43 and washers 44 are placed on the pin 22 between a jaw and the cotter key 23 to act as an anti-rattler and permit the attached ends of the jaws to separate.

On the inner face of one, and preferably both, of said jaws are formed ratchet teeth 24 for coaction with similar teeth 25 on one or both faces of the ratchet plate 26 which, in effect, is a floating element between the two jaws.

The ratchet plate 26 has an elongated aperture 27 which aligns with longitudinal slots 28 in the companion jaws, said slots preferably being open at their inner ends when considered in connection with the apparatus as a whole. The ends of a pin or lugs 29 carried by the ratchet plate 26 project into and are slidably mounted in the longitudinal slots of the jaws to assist in retaining said ratchet plate in proper position between the jaws for cooperation of the different sets of teeth.

The longitudinal slots 28 and the elongated aperture 27 register with a supporting means 30 herein shown as a trunnion carried by and preferably attached to the wall 11. A convenient construction for this supporting trunnion consists of a headless or double ended bolt fashioned to provide a body 31 from one end of which projects a reduced externally threaded shank 32 and from the other end projects a reduced neck 33 only the terminal of which is threaded.

The differences between the sizes of the body, and shank and neck provide shoulders 34 and 35.

The shank 32 is inserted in a hole in the wall 11 until the shoulder 34 contacts a face of said wall and a nut 36 is screwed onto the shank to hold the supporting trunnion in place.

To slidably retain the jaws 20 and 21, and the ratchet plate 26 on the neck of the supporting trunnion and said jaws and ratchet plate in resilient contact with one another, a spring 37 is placed on the neck and a nut 38 screwed onto the threaded terminal to hold the spring in place and adjust its tension. The nut 38 may be held in place by a cotter key 39 or other nut lock device and, if desirable, washers 40 may be placed at the ends of the spring 37.

The teeth on the ratchet plate are opposed to those on the jaws of the same unit, so that in operation the ratchet plate and jaws cannot retract relative to one another but under certain conditions, as when the ratchet plate is stopped from moving outwardly and there is room for the jaws to move in a similar direction, said jaws can be protracted relative to the ratchet plate.

In practice, the brake shoes are forced outward or towards the brake drum in any well known or suitable manner to cause an application of the brake and when released the spring 15 or other equivalent means retracts the brake shoes. During actuation of the brake shoes the adjustment mechanism units, as a whole, merely move to and fro by sliding on their supporting trunnions within the limits of the elongated apertures 27 but the retracting action of the brake shoes is arrested when the walls forming the outer ends of said apertures 27 contact their respective supporting trunnions, as depicted in Figs. 2 and 3.

Whenever the brake lining is worn to such an extent that movement of the ratchet plate 26 is stopped before the brake takes hold, the jaws 20, 21 will partly pull away from or move relative to said plate, which is possible because of the resilient or spring action of said jaws on said ratchet plate. If the slightly additional movement necessary to provide for an application of the brake is not sufficient to completely disengage the then meshed teeth, the parts will slip back to their original relative positions as the brake shoes are retracted. When the brake lining has worn to such an extent that an application of the brake causes the jaws to move the width of at least one tooth, said jaws will slip a distance equal thereto and the teeth will remesh in the new location, thus automatically providing a new adjustment in which each unit is, in effect, further extended or the jaws protracted relative to the ratchet plate.

Thereafter, the clearance between the brake lining and drum will be the same as when the lining was new or after a former adjustment, thus automatically centering the brake working surfaces as well as adjusting the shoes for wear on the linings.

In Fig. 4 I have illustrated a slight modification in which the jaws have smooth surfaces or are toothless and in their stead is provided one or more spring ratchet pawls 41 fixed to said jaws and coacting with teeth 42 on one or opposite edges of the ratchet plate 26a.

The operation and action of the modification is the same as first described form except for the spring pressed jaws which are not necessary when the spring pawls are utilized.

Particular attention is called to the open ended slots 28 which provide for a fool proof installation of the apparatus because if a mechanic should unknowingly assemble the parts so that the lugs 29 were close to inner open ends of said slots, the brake could be applied even though the lugs 29 became disengaged from the jaws by passing out of the slots. If, instead, the slots 28 were closed at the free ends of the jaws and the parts wrongly assembled the lugs 29 might prevent the jaws from moving a sufficient distance to complete an application of the brake.

From the foregoing it will be apparent that I have produced an exceedingly simple, inexpensive but durable apparatus of relatively few parts, that can be easily and quickly installed as a part of a newly manufactured vehicle or applied as an accessory to a previously built vehicle.

Of course I do not wish to be limited to the exact details of construction herein shown and described as these may be varied within the scope of the appended claims without departing from the spirit of my invention.

Having described my invention what I claim as new and useful is:

1. A unit of an automatic self-centering brake wear adjustment mechanism comprising a supporting trunnion attached to a wall of a brake structure, a pair of spaced complementary jaws having longitudinal slots and attached to a brake shoe and longitudinally slidably mounted on said supporting trunnion, a floating ratchet plate mounted on said supporting trunnion between the jaws for limited longitudinal sliding movement, lugs projecting from said ratchet plate into said slots, and cooperating means on the jaws and plate to cause them to normally move together within a limited scope while permitting the jaws to move in one direction independently of the plate when said jaws have extra space within which to move.

2. A unit of a brake adjuster comprising a supporting trunnion fixed to a wall of a brake structure, a pair of spaced complementary jaws having longitudinal slots open at their inner ends and slidably mounted on said supporting trunnion and attached to a brake shoe, a ratchet plate positioned between said jaws and having an elongated aperture registering with the supporting trunnion for limited longitudinal movement, lugs on said ratchet plate registering with the slots in the jaws to maintain the plate in position, and complementary means on the jaws and ratchet plate cooperating to cause them to normally move to and fro together a limited distance while permitting the jaws to move in one direction only relative to the plate when said jaws can move after the plate has been stopped.

3. The structure of claim 2 wherein the complementary means consists of teeth on the ratchet plate and spring pawls on the jaws.

4. The structure of claim 2 wherein the complementary means consists of opposed teeth on the ratchet plate and jaws, and means to resiliently urge the jaws towards the plate.

FRANK B. BUFFINGTON.

REFERENCES CITED

The following references are of record in the file of this patent:

UNITED STATES PATENTS

| Number | Name | Date |
| --- | --- | --- |
| 1,825,555 | Stern | Sept. 29, 1931 |
| 2,117,288 | Blucher | May 17, 1938 |
| 2,286,711 | Buffington | June 16, 1942 |